United States Patent [19]
Gottschalk et al.

[11] Patent Number: 6,073,947
[45] Date of Patent: Jun. 13, 2000

[54] SUBSTANTIALLY WELD FREE FRAME BRACKET ASSEMBLY

[75] Inventors: Michael J. Gottschalk, Grandville; Michael J. Keeler, Blacklick, both of Ohio

[73] Assignee: The Boler Company, Itasca, Ill.

[21] Appl. No.: 09/103,551

[22] Filed: Jun. 24, 1998

Related U.S. Application Data

[63] Continuation-in-part of application No. 09/052,131, Mar. 31, 1998, Pat. No. 6,007,078.

[51] Int. Cl.[7] ............................................. B60G 3/12
[52] U.S. Cl. ............................ 280/124.128; 280/124.157; 280/683
[58] Field of Search ........................... 280/86.5, 124.153, 280/124.128, 124.157, 124.163, 678, 683

[56] References Cited

U.S. PATENT DOCUMENTS

| | | | |
|---|---|---|---|
| 3,510,149 | 5/1970 | Raidel | 280/124 |
| 3,771,812 | 11/1973 | Pierce et al. | 280/124 F |
| 3,861,708 | 1/1975 | Fier | 280/124 F |
| 3,902,734 | 9/1975 | Fier | 280/106 R |
| 3,904,220 | 9/1975 | Fier | 280/124 F |
| 4,379,572 | 4/1983 | Hedenberg | 280/711 |
| 4,770,430 | 9/1988 | Lange | 280/81 A |
| 4,792,148 | 12/1988 | Hintz | 280/81 A |
| 4,802,690 | 2/1989 | Raidel | 280/713 |
| 4,881,747 | 11/1989 | Raidel | 280/81.6 |
| 5,015,004 | 5/1991 | Mitchell | 280/81.6 |
| 5,018,756 | 5/1991 | Mitchell | 280/81.6 |
| 5,058,196 | 10/1991 | Hicks | 280/704 |
| 5,220,972 | 6/1993 | Proia | 180/24.01 |
| 5,403,031 | 4/1995 | Gottschalk et al. | 280/704 |
| 5,479,999 | 1/1996 | Proia | 180/24.01 |
| 5,620,194 | 4/1997 | Keeler et al. | 280/81.6 |
| 5,868,418 | 2/1999 | VanDenberg | 280/704 |

OTHER PUBLICATIONS

Ridewell Corp. "Auto–Reversing Kit/Short" Drawing Number AS–7570C#4 May 14, 1991.

*Primary Examiner*—Paul N. Dickson
*Attorney, Agent, or Firm*—Hall, Priddy, Myers & Vande Sande

[57] ABSTRACT

A substantially weld free frame bracket for connecting a suspension to the frame rail of a heavy duty vehicle which includes a plate member and an attached cradle having pivotally bolted to it one or more beams, the pivotal connecting bolts serving as the connection to the plate member. A cross-member connects opposing brackets on either side of the vehicle.

29 Claims, 8 Drawing Sheets

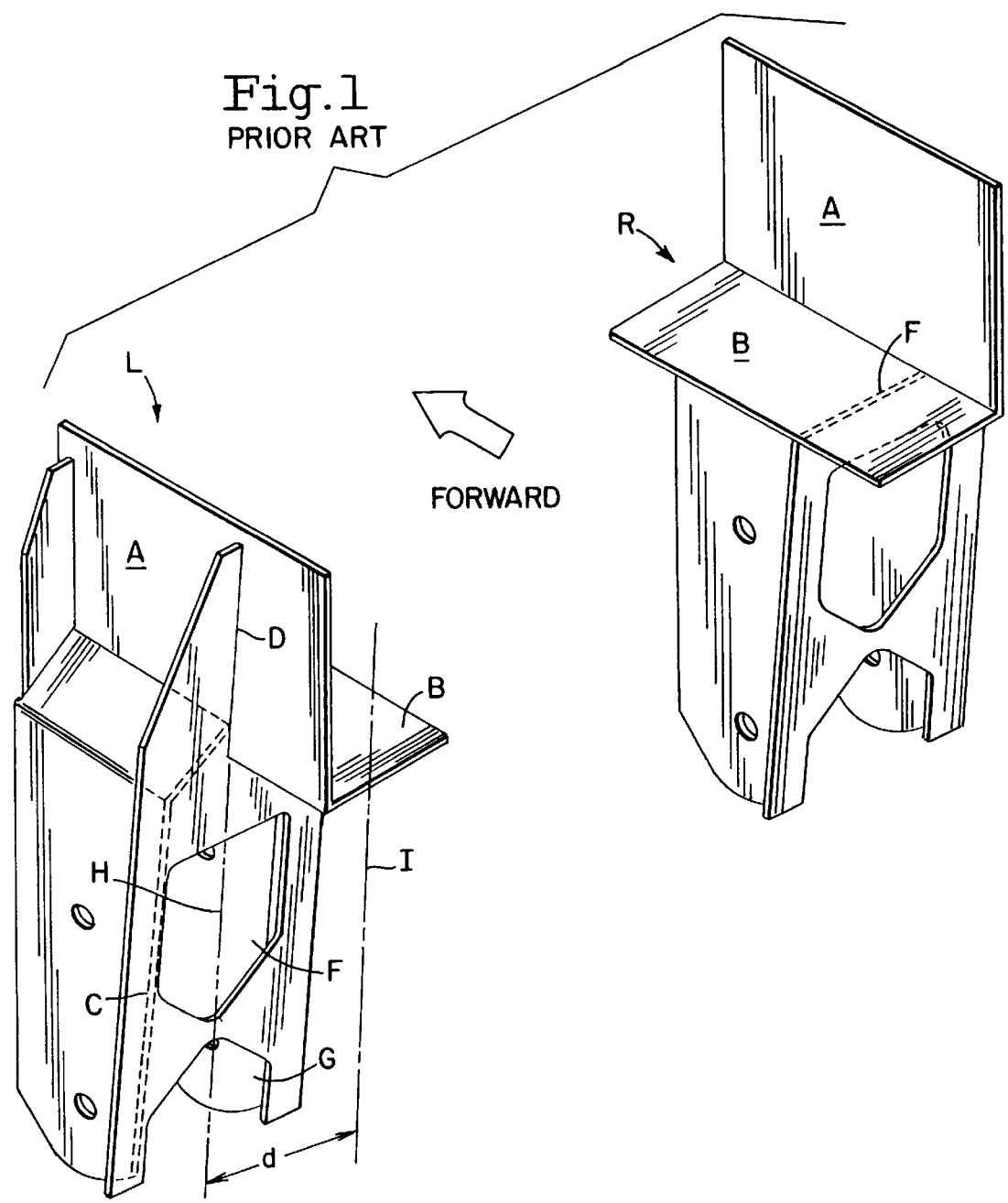

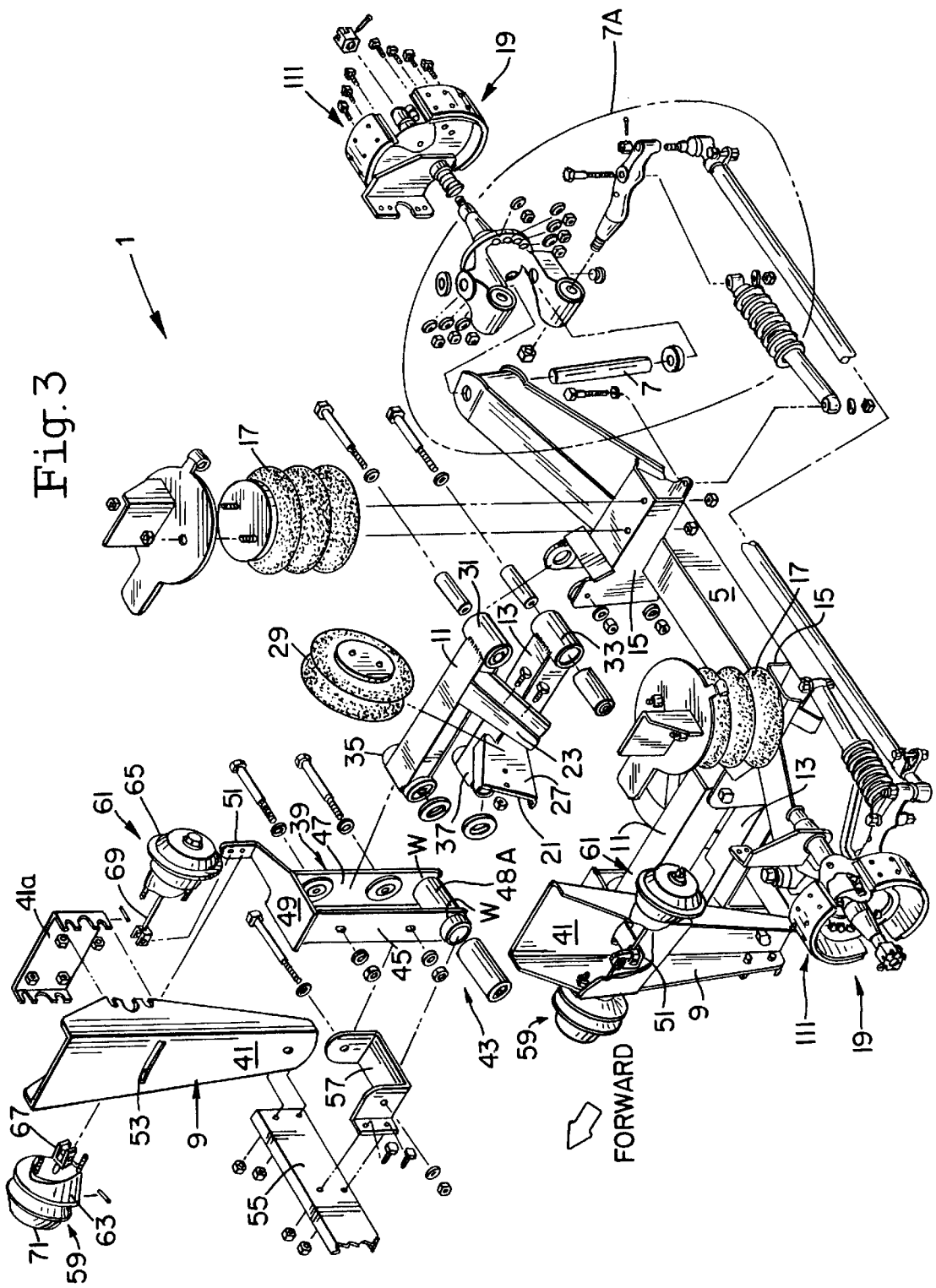

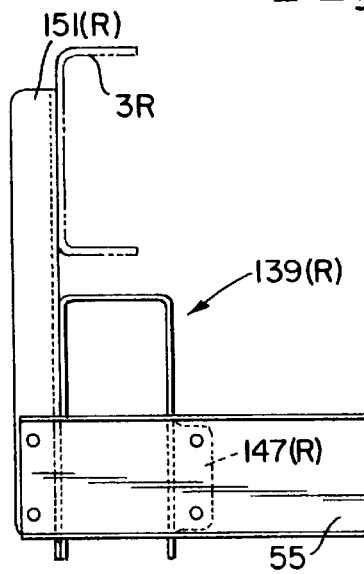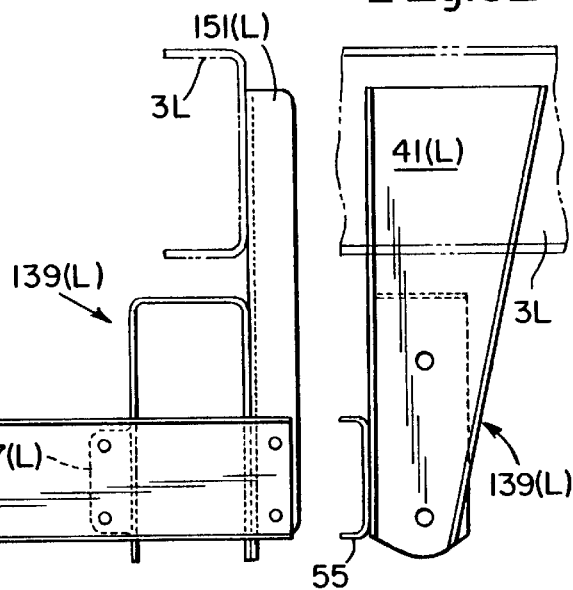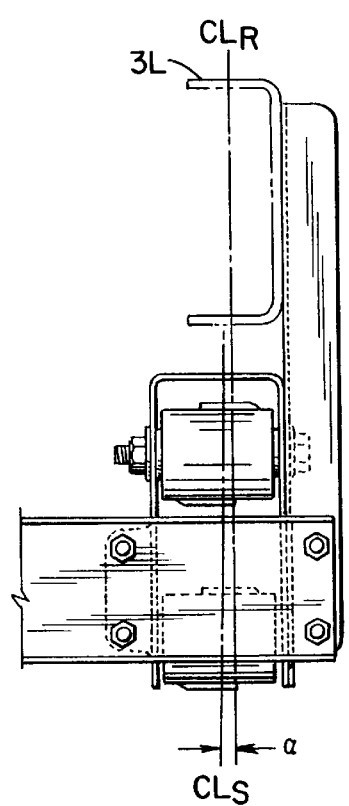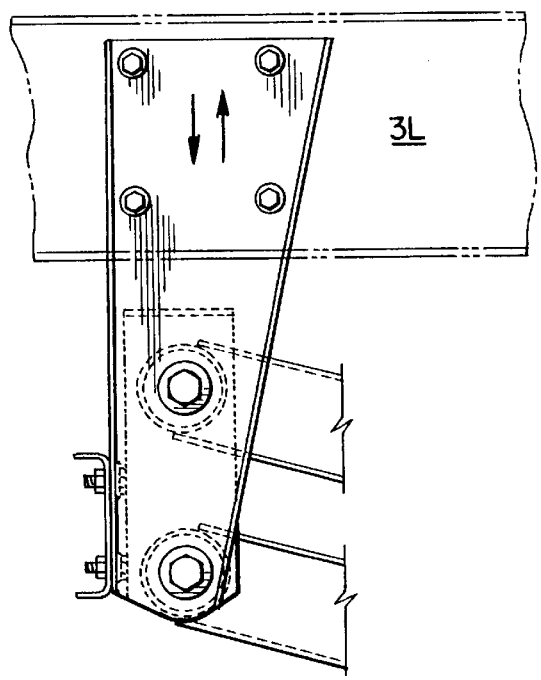

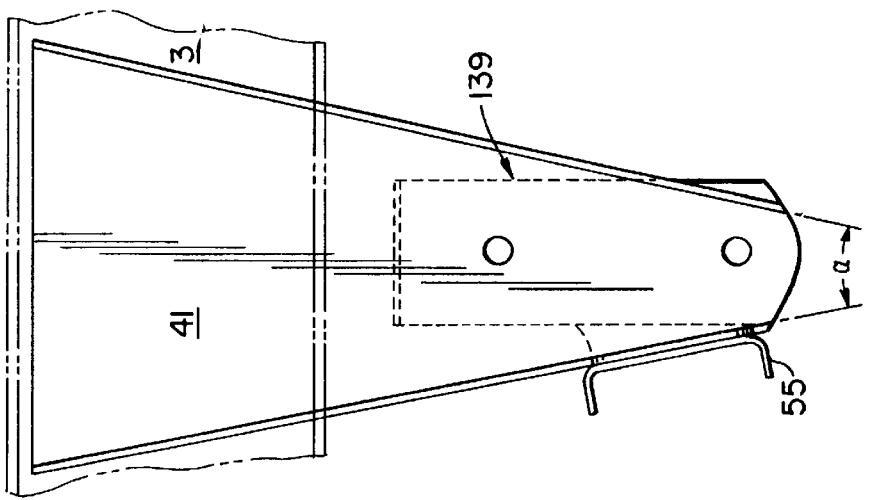
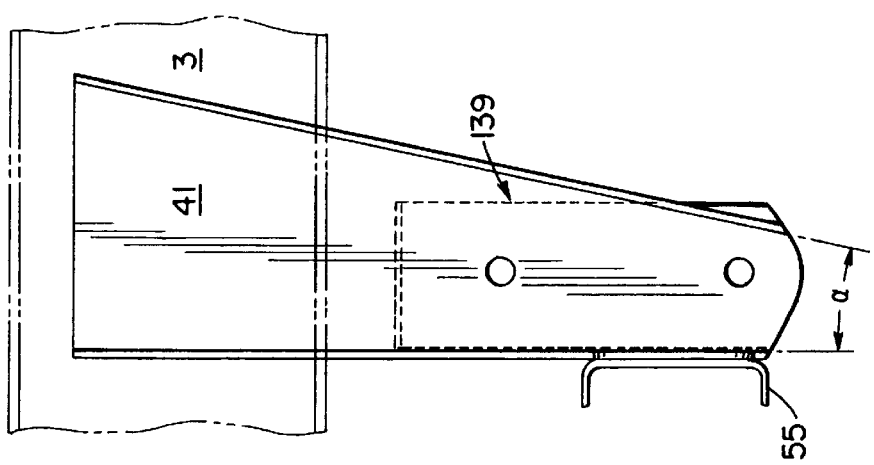
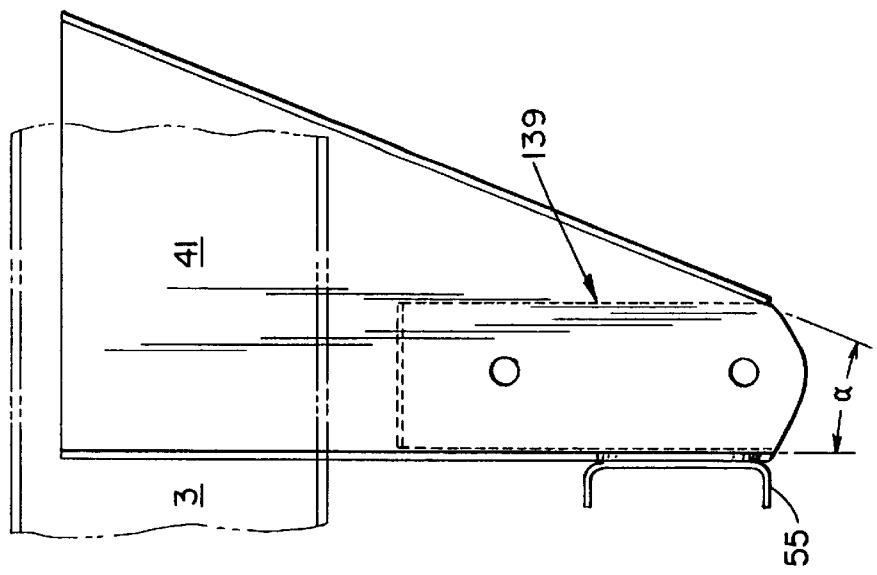

SUBSTANTIALLY WELD FREE FRAME BRACKET ASSEMBLY

RELATED APPLICATIONS

This application is a continuation-in-part of our application Ser. No. 09/052,131 filed Mar. 31, 1998 now U.S. Pat. No. 6,007,078 and entitled "SELF-STEERING, CASTER ADJUSTABLE SUSPENSION SYSTEM".

FIELD OF THE INVENTION

This invention relates to frame bracket assemblies for wheeled vehicle suspensions. More particularly, this invention relates to substantially weld free frame bracket assemblies for connecting suspension systems of a vehicle to the vehicle's frame member.

BACKGROUND OF THE INVENTION

The medium and heavy duty truck and semi-trailer industry has long employed frame brackets (often referred to as "hanger brackets") for connecting at least one end of a suspension system to the frame member of the vehicle to which the suspension is to be attached. Such brackets come in a wide variety of styles and designs, but in virtually every instance of a recognized or commercially acceptable bracket there must be employed various welds to maintain the integrity of the bracket. Such welds have been found safe and effective for their intended purpose and have served the industry well. However, welding is often labor intensive or, if done with robotics, can require a significant capital investment. In short, they are expensive. Moreover, welds, while safe if properly made, have, by their nature, a start and stop point which are often located at the highest point of stress and thus are subject to the potential, at these points, of the possibility of fatigue crack initiation.

Certain well accepted and conventional hanger brackets have often needed to employ, for adequate attaching capabilities, an "L" shaped mounting mechanism which gloves one side (usually the outboard side) and bottom of the vehicle's frame rail as the attaching surfaces. This "L" shaped mounting mechanism automatically sets the height of the bracket and prohibits any higher mounting by its inherent "L" shape and glove-like construction.

FIG. 1 illustrates a typical example of a well known right (R) and left (L) side pair of frame brackets for connecting a liftable or non-liftable beam type suspension (not shown) at one end to the right and left side frame rails, respectively, of a vehicle. The other end of the beams are conventionally connected to their respective frame rail, usually by an air bellows of known construction. An example of such a suspension employing this bracket is disclosed in U.S. Pat. No. 5,403,031. As can be seen, the mechanism for connecting the bracket to its frame rail is an "L" shaped member having a vertical flange A and a horizontal flange B. Flange B dictates the limit on the distance upwardly that brackets R and L may be located on the frame rails. Indeed, since flange B is designed to fit snugly against the underside of the frame rail, flange B, usually by design, determines the precise distance the suspension can be located below the frame rail. No flexibility is allowed the installer (OEM or otherwise) who may face several different frame rail configurations, such as straight frame rails, as well as so-called "drop belly" frames.

With still further reference to FIG. 1, brackets R and L at their various seams (e.g. C, D, E, etc.) are held together by welds. While proven safe and effective, these welds are generally not accessible by robotics, and the construction is highly labor intensive. Moreover, as illustrated by distance "d", orifices F and G's center line H, and thus the center lines of the beams or control arms (not shown) which extend into them in a conventional fashion, is offset outboard (usually a distance "d" of ¼ to ½ inches) of center line I of the frame rail of the vehicle when snugly fit to "L" shaped member A, B. This widens the suspension. It, of course, would be more desirable to narrow the distance between right and left side control arms. The less space consumed by the suspension, the easier it is to accommodate other equipment required on the vehicle where envelopes of compliance are often quite small.

In view of the above, it is apparent that there exists a need in the art for a substantially weld free bracket assembly which, in addition, provides for a flexible choice of installation heights, as well as the reduction or elimination of the outboard offset distance "d" as described above.

It is a purpose of this invention to fulfill these and other needs in the art more apparent to the skilled artisan once given the following disclosure.

SUMMARY OF THE INVENTION

Generally speaking, this invention fulfills the above-described needs in the art by providing a substantially weld free frame bracket for connecting a wheel-bearing axle suspension system to a frame member of a vehicle, the frame bracket comprising:

an elongated plate member having a first end for connection to the frame member of the vehicle and a second end opposite the first end;

a generally U-shaped cradle member including a pair of downwardly extending leg portions spaced laterally from each other and a laterally extending portion abridging the space between and connecting the spaced pair of leg portions one to the other; and a non-welded attachment connecting the cradle member to the elongated plate member, the attachment being located proximal the second end of the elongated plate member.

In certain preferred embodiments of this invention the aforesaid substantially weld free hanger bracket is used as the hanger bracket in the lift axle suspension systems of U.S. Pat. No. 5,403,031 and its successful commercial counterpart known as the PARALIFT™ suspension sold by Hendrickson Auxiliary Axle Suspensions, Inc., an affiliated entity of The Boler Company. In still other preferred embodiments of this invention, the aforesaid substantially weld free hanger bracket is used as the hanger bracket in the unique suspension systems of copending application Ser. No. 09/052,131 filed Mar. 31, 1998 by Michael J. Gottschalk and Michael J. Keeler, commonly assigned herewith, and entitled "SELF-STEERING, CASTER ADJUSTABLE SUSPENSION SYSTEM". The disclosures of U.S. Pat. No. 5,403,031 and the aforesaid pending application are incorporated herein by reference.

This invention will now be described with respect to certain embodiments thereof as set forth in the following drawings wherein:

IN THE DRAWINGS

FIG. 1 is, as aforesaid, a perspective view of a pair of PRIOR ART hanger brackets used in the heavy duty truck and semi-trailer art.

FIG. 3 is an exploded perspective view of the environment of use for the brackets of this invention, as illustrated in FIGS. 2A,B.

FIG. 5A is a rear plan partial view of the bracket assembly of FIG. 4.

FIG. 5B is a side plan view of FIG. 5A.

FIG. 6A is a partial rear plan, right side view of the embodiment of FIGS. 5A,B with control arms connected thereto.

FIG. 6B is a partial side plan view of the embodiment of FIG. 6A.

FIGS. 7A–C are partial side plan views of brackets according to this invention having different fanning angles to accommodate different bolt patterns for connection to the vertical flange of the frame rail of a vehicle.

Figure 8:
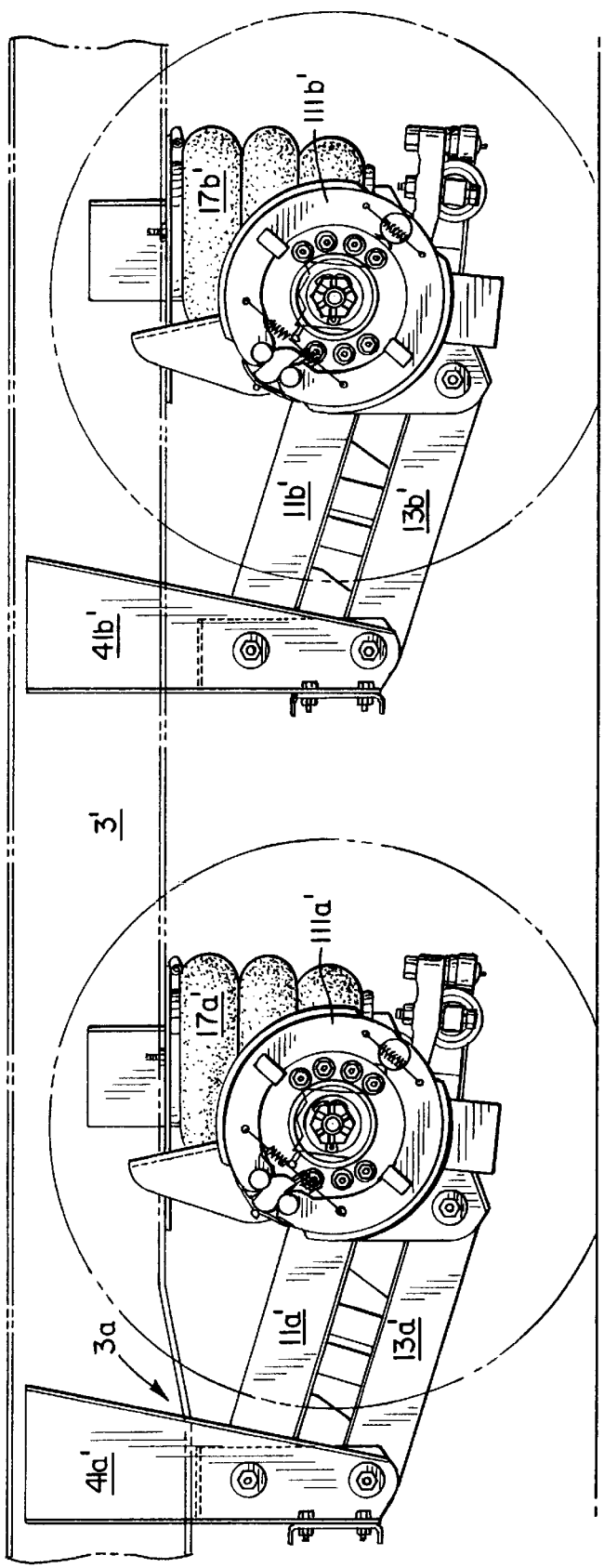

FIG. 8 is a partial side plan view of a heavy duty vehicle having drop belly frame members to which are attached two suspensions, each having an embodiment of a frame bracket according to this invention (only one side of the vehicle being illustrated for convenience).

Figure 9:
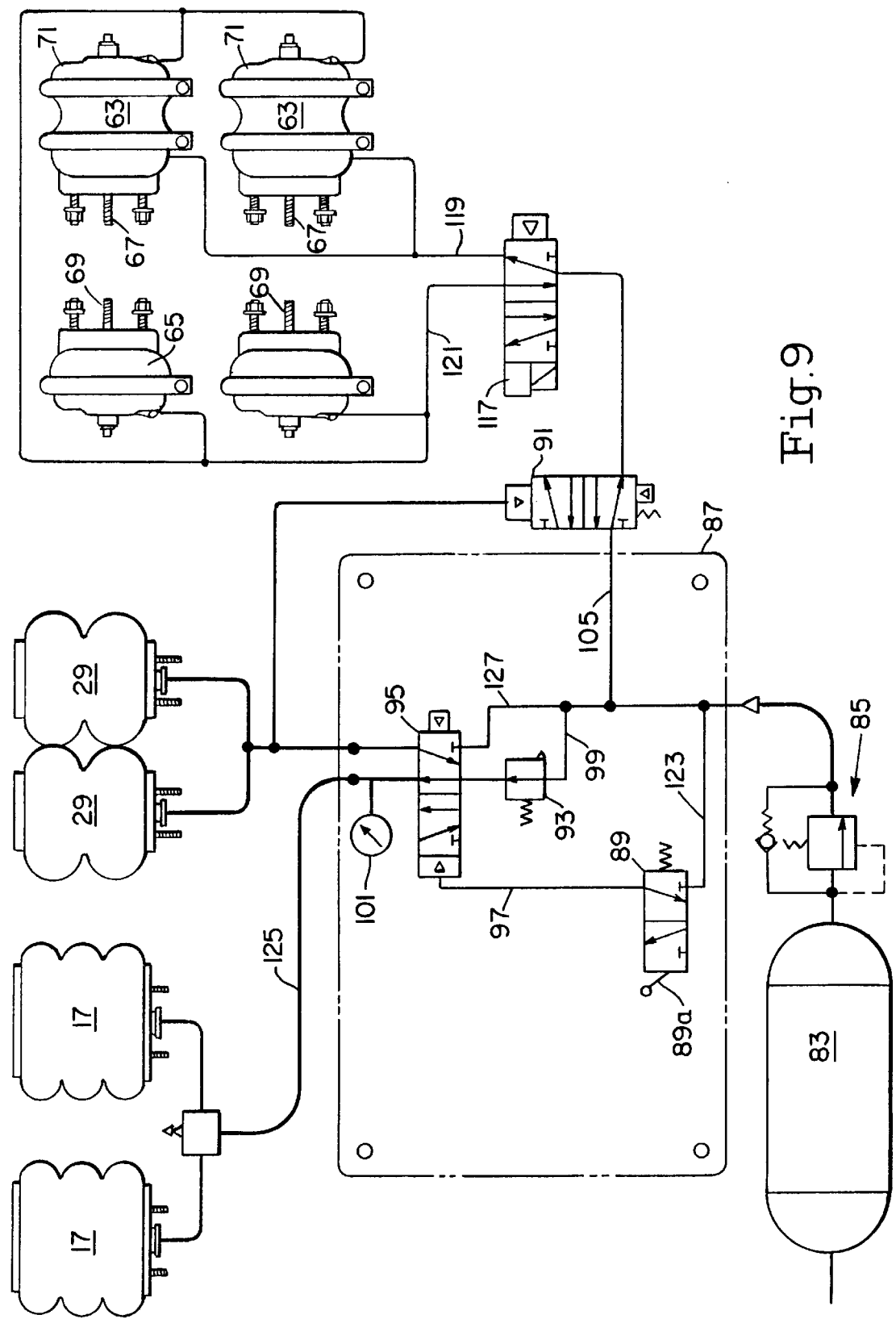

FIG. 9 is a schematic diagram of the operating controls for raising or lowering the axle suspension of FIG. 3 and/or adjusting the caster of the wheel-bearing axle.

DETAILED DESCRIPTION OF THE INVENTION

It is understood, of course, that the unique bracket assemblies of this invention are useful as part of a wide variety of suspension systems for connecting the vehicles' road-engaging wheels to the frame rails of vehicles. Thus while, at times, these assemblies are described below in terms of certain suspensions, the brackets of this invention are not necessarily limited to use therewith or as a part thereof.

As aforesaid, however, the bracket assemblies of this invention have been found quite useful in suspension systems of the type described in the aforesaid U.S. Pat. No. 5,403,031 and its progeny, as disclosed in the aforesaid copending application Ser. No. 09/052,131. For orientation purposes, then, attention is first directed to FIG. 3 herein (which is also substantially FIG. 3 in the aforesaid copending application) FIG. 3 illustrates a highly advantageous liftable axle suspension system with a unique caster adjustment feature in which hanger bracket 9, along with U-shaped cradle 39 and their associated parts, make up an embodiment of a substantially weld free bracket assembly according to this invention. The mechanism for lifting and lowering the wheels will not be described here, but are incorporated herein by reference and are easily constructed and well known to the skilled artisan once given FIGS. 2A,B and 3.

Figure 2A:
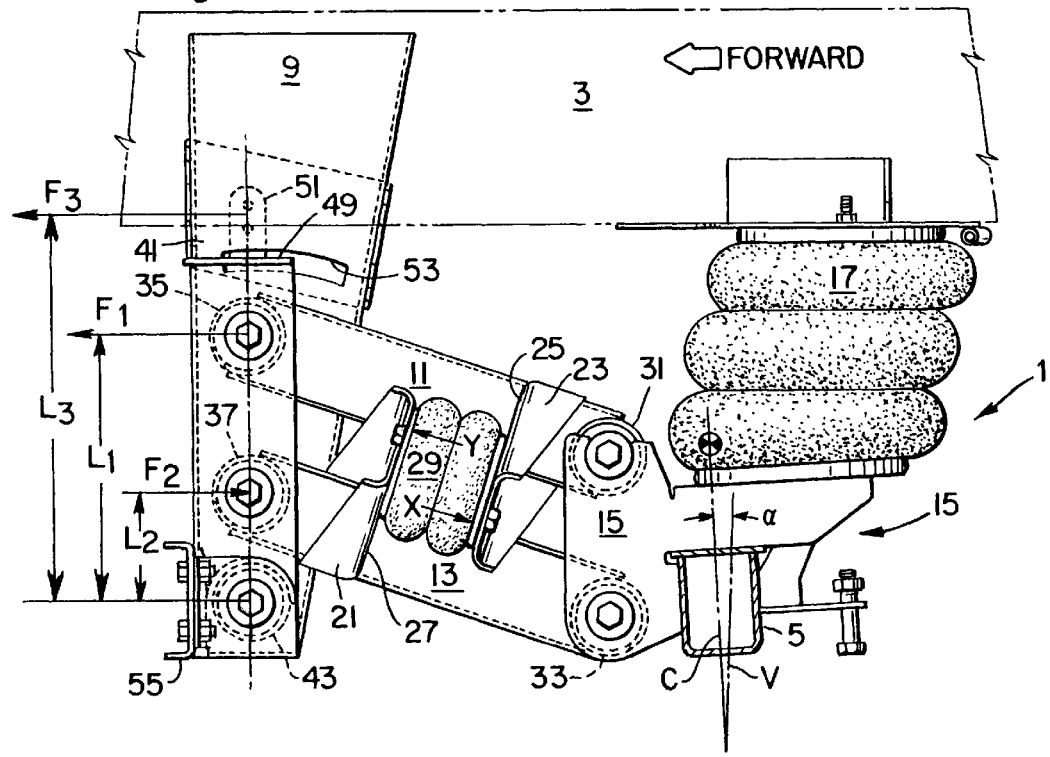
FIG. 2A is a side plan view of a hanger bracket according to this invention in use as part of a preferred suspension system according to this invention, shown in a reverse travel mode of the axle caster.

As illustrated in FIGS. 2A,B and 3, suspension 1 includes on each side of the vehicle associated with a respective longitudinal frame member 3, a hanger bracket 9, an upper longitudinal beam member (i.e. control arm) 11, a lower longitudinal beam member (i.e. control arm) 13, an axle seat generally represented at 15 and an airbag 17. Axle 5, of course, extends laterally across the vehicle and includes at either end a conventional wheel assembly with brake pads, etc. as illustrated generally at 19 (FIG. 3). Axle 5, via connection axle seat 15, connects the two sides of suspension system 1 as does "C"-shaped cross-member 55.

Also extending laterally across the vehicle and coordinating the steerability of each wheel 111 (internal brakes only shown, for convenience), are various conventional interrelated members, all connected in a known fashion to render the axle suspension system 1 steerable through a series of interconnected pins and rods. For convenience this kingpin steerable assembly, being conventional, is indicated generally in the framed in area as item "7A". Such assemblies are well known in the art and their various illustrated parts need not be further detailed here.

Upper and lower beam members 11, 13 are preferably substantially parallel so as to achieve the benefits of a parallelogram axle suspension system. In the same fashion as in U.S. Pat. No. 5,403,031, there may optionally be provided in the suspensions of this invention bi-directional bellows means for raising and lowering the wheels 111 from and into road engagement. As illustrated, bellows means include a pair of appendages 21 and 23 which are connected to and are located between upper beam member 11 and lower beam member 13. As illustrated here, appendage 21 is connected to bottom beam 13, while appendage 23 is connected to top beam 11, both appendages extending inboard of the suspension on both sides of the vehicle. In this arrangement expansion of any airbag located between opposing appendages will cause lifting of the axle (as bellows 17 is deflated). On the other hand, inflating bellows 17 and deflating airbag 29 lowers the axle to engage the wheels with the road surface.

The face plates 25, 27 of appendages 21 and 23 extend substantially perpendicular from the beams 11 and 13, and are substantially parallel one with respect to the other. Expandable air bellows (i.e. airbag) 29 is located between face plates 25, 27 (FIG. 3), and through the parallelogram arrangement of the parts herein, expand in a truly "bi-directional" manner (i.e. expands or contracts in a substantially linear direction, thus dividing the lifting and lowering forces of bellows 29 between upper and lower beam members 11 and 13, respectively, as more fully described in the aforesaid '031 patent).

Maintaining the parallelogram nature of system 1 are four pivots of conventional type (elastomeric bushing pivots) connecting each end of beams 11 and 13 to hanger bracket 9 and axle seat 15, respectively. Pivots 31 and 33 are the axle seat pivots, while pivots 35 and 37 are the hanger bracket pivots. Preferably the distance between pivots 31 and 33 is the same as the distance between pivots 35 and 37, thereby to maintain the true parallelogram nature of the suspension.

Air bellows 17 are connected at their top end to their respective frame members 3 and at their bottom end to axle seat 15 in conventional fashion. In this way, and in a known manner, these air bellows are the primary means for taking up (i.e. handling) the articulation and loadcarrying forces of the suspension (and thus the vehicle) experienced during vehicle operation over the road surface. Some of these forces, however (e.g. braking forces), must also be taken up in pivots 31, 33, 35 and 37, and thus these four pivots are sized accordingly, in a known way, to account for these forces.

As described above and to this point, auxiliary axle suspension system 1 is of well known construction, both through successful use in industry and as disclosed in the aforesaid U.S. Pat. No. 5,403,031. However, now, in accordance with the invention of the aforesaid copending application, a unique caster adjusting mechanism is provided in place of the manual mechanism described and illustrated in this aforesaid patent. As herein illustrated, a mechanism for adjusting caster is uniquely provided in association with hanger brackets 9, rather than in one of the pivots between a beam member and axle seat as in the aforesaid patent.

More specifically, the unique caster adjusting mechanism illustrated herein includes, with respect to each side of the vehicle (and hanger bracket), a cradle 39 pivotally connected to vertical side plate 41 of hanger bracket 9 by pivot 43. Pivot 43 is of the same type as pivots 35 and 37, and allows cradle 39 to be pivoted with respect to stationary hanger bracket 9. Differing further from the aforesaid U.S. Pat. No. 5,403,031 (wherein pivots 35 and 37 are connected to hanger bracket 9), is the fact that in this invention pivots 35 and 37 are independent of hanger bracket 9. As can be seen, cradle 39 is a continuous generally U-shaped member having a top and a pair of opposing vertical side plates 45, 47, all without welding. Pivots 35 and 37 extend between plates 45 and 47 and are pivotally connected thereto rather than to hanger bracket plate 41. Cradle 39 then further includes on top of its top side, a top flange 49 having an arm 51 extending outwardly therefrom and through a guide slot 53 in plate 41 of hanger bracket 9 when the optional caster adjusting mechanism is to be employed. Bottom plate 57 may be provided to strengthen the assembly, but, as illustrated, must not interfere with the ability of cradle 39 to be pivoted about pivot 43 with respect to hanger bracket 9.

When arm 51 is employed it may be welded, riveted or otherwise connected to the top of U-shaped cradle 39. This, it is to be noted, is the only weld, if employed, in the bracket assembly except for the use of welds at the lower bushing, herein identified at "W". Since this part is easily prefabricated and constitutes a minor amount of welding, the term "substantially weld free" contemplates and includes within it this minor weldment.

As can now be further seen, and as described more fully below, if cradle 39 is pivoted about pivot 43 in either direction, the parallelogram pivots 35 and 37 also simultaneously move with respect to pivot 43. Since pivots 31 and 33 are connected to stationary axle seat 15, to which axle 5 is connected, the caster angle $\alpha$ of axle 5 (and thus the steerability of wheels 111) is changed in this embodiment by movement of arm 51, while the essential benefits of a parallelogram suspension are maintained. By moving arm 51 in the forward direction proximal one end of slot 53 using brake assemblies 61, 65, 69, 71, a negative caster angle $\alpha$ of $-5°$, or in certain embodiments $-3°$, is achieved in axle 5 for reverse steerable travel. If arm 51 is moved rearward proximal the opposite end of slot 53, thus achieving a positive caster angle $\alpha$ of $5°$ in axle 5 for forward steerable travel. The angles of caster, size of slot 53, etc. may be chosen and varied as the application dictates and need not be $\pm 3°$ or $\pm 5°$, which are simply preferred representative angles $\alpha$ found useful in many trucking environments both on and off road.

Figure 2B:
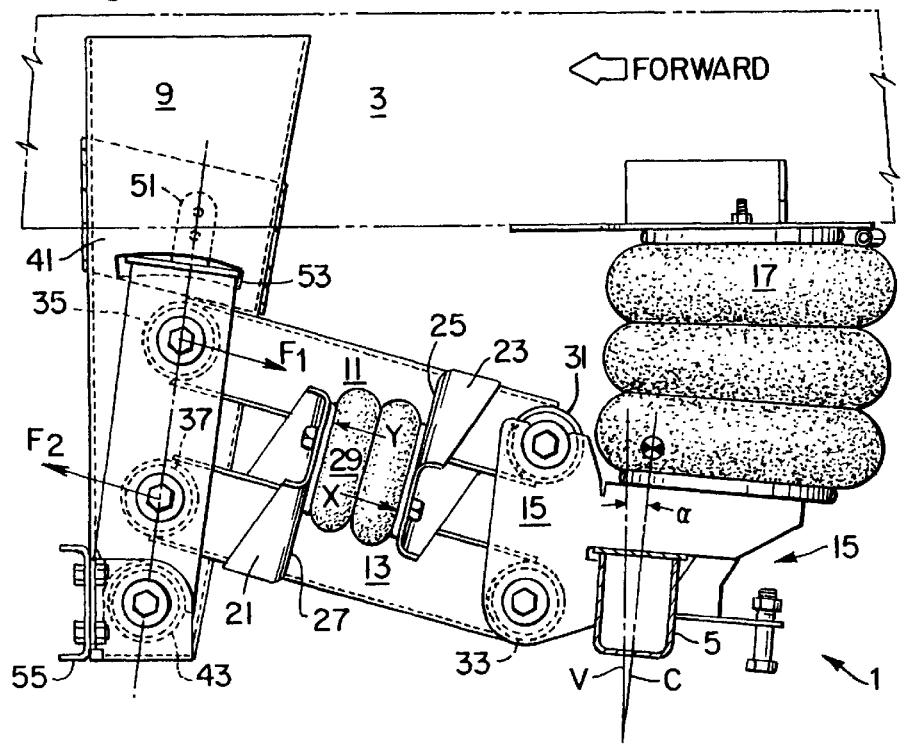
FIG. 2B is a partial side plan view of the embodiment of FIG. 2A, but shown in a forward travel mode of the axle caster.

In a particularly preferred embodiment of this invention, pivot 43 is rendered substantially without torsional moment under both normal and abnormal operation. By "without torsional moment", as used herein, is meant that pivot 43 is effectively isolated from torsional forces, such as braking forces and the like. These forces are illustrated in FIGS. 2A, 2B by resultant vector force arrows $F_1$ and $F_2$. As illustrated, pivots 35, 37 and 43 are substantially vertically spaced one from the other, such that there is a distance $L_1$ separating pivot 35 from pivot 43 and a distance $L_2$ separating pivot 37 from pivot 43. The resultant force, due to operational articulation of pivot 35, e.g. as would occur during vehicle braking, is the quantity $L_1F_1$ and the quantity $L_2F_2$ for pivot 37. $F_2$ and $F_1$ are not of the same magnitude and are reasonably calculable for most general purposes. They act in the opposite direction due to the generally parallelogram nature of the suspension. Thus by making the quantity $L_1F_1$ substantially equal in magnitude to its opposite acting quantity $L_2F_2$ through selection of the appropriate lengths $L_1$ and $L_2$, the net torsional force on pivot 43 (and any mechanism attached to arm 51 to move it) is minimized or rendered, ideally, substantially zero. Moreover, the torsional force $F_3$ at lever arm length $L_3$ is advantageously also minimized.

A typical set of parameters for use on suspensions finding particular utility in conventional semitrailers is for $L_1$ to be 11.5 inches, while $L_2$ is 4.0 inches, and $L_3$ is 14.5 inches, wherein $F_1$ is about 2100 lbs., $F_2$ is about 5200 lbs., and $F_3$ is, in effect, then, the force of the brake chamber. In such a suspension it has been found that forces in pivot 43 are at least minimized in most applications and that not only is pivot 43 longer lasting, but that the mechanism (hereinafter described) for moving arm 51 in slot 53 is substantially isolated (protected) from undue operational (torsional) forces experienced during vehicle use, and need not be overly designed.

It is understood that any of a number of mechanisms may be employed to shift the axle caster, such as a simple, manually operated, lever rod conveniently located for use by the operator, and securable to be sure the caster angle is "locked" in place once selected. Other possible mechanisms include air or hydraulically operated piston assemblies, an opposing airbag (as described in our aforesaid copending application Ser. No. 09/052,131), or electronic solenoids, all having "locking" means to insure maintenance of angle $\alpha$ once selected. Turning now, however, to FIG. 3, the mechanism therein includes a pair of opposing air brake chamber assemblies 59, 61 of known type (e.g. 24" MGM air brake chambers) having an air brake chamber 63,65 and reciprocal rods 67, 69, respectively.

Preferably one or the other of cylinders 59 or 61 is provided with an additional parking spring brake chamber 71 (here attached to chamber 63) which, in conventional manner, upon loss of air pressure causes the large parking brake spring (not shown) to automatically extend the rod to which it is attached, to lock the caster in a specific mode. Here, in preferred form, spring brake chamber 71, attached to air chamber 63 will, upon loss of air in the system, cause rod 67 to extend, quickly shifting the caster $\alpha$ to a "forward" steerable travel mode.

In either event, respective air brake chamber assemblies 59 and 61 provide two important functions. By extending one rod and retracting the opposite rod (and by adjusting the length of the rods accordingly) a full range of movement from a positive (forward steerable) to a negative (rearward steerable) caster angle $\alpha$ can be achieved. In addition, by using opposing chambers in this way, the desired caster angle, once achieved, is effectively "locked" in place by these opposing assemblies 59 and 61. In this respect, it can be seen that when rod 67 is retracted and rod 69 extended, cradle 39 pivots about pivot 43 causing caster angle a to be in the "reverse" travel mode for steerability, while the opposite operation causes caster angle $\alpha$ to assume its "forward" travel mode for steerability. In both modes, caster angle $\alpha$ is "locked" in place by the opposing brake chambers.

Moreover, when the above-described lift option is provided through the use of air bellows 29, these bellows, if maintained in slightly expanded form or via their internal, conventional bumpers (not shown), even when the wheels 111 are fully lowered into road engagement, will further serve to "cushion" any forces experienced at rod 67. A further air bellows (not shown) may be provided on the side of each beam 11 opposite that of bellows 29 and acting in opposite direction, if desired, to "cushion" or further "cushion" any forces on rod 69. As can be seen, the mechanism employed to pivot cradle 39 (arm 51) sees a substantially reduced amount (and preferably, substantially a zero amount) of braking or other operationally induced forces due to the nature of the triple pivot arrangement, in which $L_1F_1$ is made to be equal to or to approximate $L_2F_2$. This enables the use of conveniently sized mechanisms whose rods, pistons or chambers do not have to be oversized and complex, to effectively shift the saddle by applying a force $F_3$ at the end of lever arm length $L_3$ (i.e. at 51).

FIG. 8 is provided to demonstrate how in certain embodiments of this invention the frame brackets of this invention may be mounted at different heights and thus are applicable to use on so-called "drop belly" frames. Here two suspensions similar to the suspension partially illustrated in FIG. 4, but now completed with wheels 111', air bellows 17', etc. included, are mounted in tandem along frame rail 3'. In this case, frame rail 3' is a drop belly frame rail at location 3a. A conventional bracket such as shown in FIG. 1 presents significant problems due to its glove-like "L" shaped flange as described above if mounting is attempted, since two different mounting heights are required, yet the suspensions, being the same, require the same mounting height. The subject invention overcomes this problem. As illustrated, nonglove-like plate 41' allows for uniform mounting height even though the forwardmost suspension must be mounted (via bracket 41a') at the drop belly portion 3a of the frame 3'.

Turning now to FIG. 9, an embodiment of the operating controls for adjusting the caster of the embodiment in FIG. 3 is schematically illustrated. As such, they may also be used to raise and lower the axle. For example, as shown, air delivered to the system via air supply reservoir 83 (e.g. the air reservoir for the air brakes if such is employed on the vehicle) passes through a pressure protection valve 85 before reaching the system's control panel 87. At panel 87, flow is directed to a two-position toggle valve 89, a spring return pilot valve 91, a pressure regulator 93 and an air pilot valve 95. Vertical axle position (i.e. lifting and lowering) is controlled by toggle valve 89 which may be conveniently located in the cab of the vehicle within easy reach of the operator.

With toggle valve 89 shifted via handle 89a into its "down" or "ride" position, as shown in FIG. 8, no air signal passes through line 97 to activate pilot valve 95. In this state, air from line 99 enters pressure regulator 93 which thereby controls the flow of air through pilot valve 95, pressure gauge 101, quick release valve 103, and to auxiliary axle ride springs 17. Suspension air capacity is conventionally determined based upon ride spring pressure, shown by pressure gauge 101, and is adjusted with pressure regulator 93. Typical pressures employed are 80–90 psi.

During operation of a loaded vehicle with the auxiliary axle in the "down" position and wheels 111 engaging the road surface, caster angle α is adjusted to correspond with either the forward or reverse direction of intended vehicle travel. This is accomplished by actuating the two service brake chambers 65 and the two spring brake chambers 63/71 which are plumbed independent of the vehicle's braking system. Here, air is supplied to the caster adjusting portion of the control system via line 105, and passes through pilot valve 91 which is normally open when the auxiliary axle is in the "down" position. Supply of air is thus directed to either the two service brake chambers 65 and the safety chamber portions 71 of the two spring brake chambers 63 thereby extending rods 69 (and retracting rods 67) to create a negative axle caster for reverse travel, or, in the opposite mode, to the service sides of the two spring brake chambers 63 (rods 69 retracting, rods 67 extending) to create a positive axle caster for forward travel. Flow direction is selected (controlled) by operation of 4-way solenoid valve 117 actuated via an electronic input in a conventional fashion from the vehicle's "reverse" light system (not shown) or any other equivalent source.

In the normally open position as shown (i.e. with no input signal from the vehicle), flow is directed to line 119 and exhausted from line 121 for forward vehicle travel (i.e. "positive" caster). Exhausting line 121 disengages the service brakes and activates the safety chamber portions 71 of the two spring brake chambers 63. Additional input force to maintain ("lock" in) positive caster is provided by the spring brake chambers due to the full line pressure supplied to the service portions of these chambers. With an input signal from the vehicle indicating reverse travel, air flow is redirected by solenoid valve 117 to line 121 and exhausted from line 119. This releases spring brake chambers 63 and activates the service brake chambers 65, changing the axle caster angle α from a "positive" forward steerable mode to a "negative" reverse steerable mode.

Repositioning toggle valve 89 (via handle 89a) by the vehicle operator to the "up" position, initiates and maintains the wheels in their "lifted" or nonroad engaging position. In this "up" position, toggle valve 89 passes an air signal from line 123 to line 97 activating pilot valve 95. Pilot valve 95, in turn, responds by exhausting air pressure from line 125, and by directing full line pressure from line 127 to lift airbags (springs) 29 and to the pilot port of pilot valve 91. Evacuation of air from line 125 causes quick release valve 103 to exhaust pressure from airbags (springs) 17. With airbags 17 exhausted and lift airbags 29 at full line pressure, pilot valve 91 then stops flow from line 105 and exhausts either line 119 or line 121, whichever line is pressurized by solenoid valve 117. The line not pressurized by solenoid 117 is exhausted via solenoid valve 117. If both lines 119 and 121 exhaust (e.g. as by failure of the air system), safety chambers 71 of spring brake chambers 63 activate, creating a positive axle caster (and maintaining it) for forward steerable travel, regardless of solenoid valve 117's actuation, when the wheels are in the lifted position. On the other hand, if the wheels were in their road-engaging or "down" position when a loss of air pressure occurred, check valve 103 maintains air pressure in airbags 17, while lift bags 29 would be exhausted of air thus maintaining road engagement. In addition, spring brake chambers 71 would be activated extending rods 67 to automatically secure the wheels in a "forward" steerable caster angle α.

The above description is, as aforesaid, by way of orientation through the selection of a particularly preferred environment (suspension assembly) in which the substantially weld free bracket assemblies of this invention may be employed. Focussing, in this respect, with more particularity on FIG. 3 it can be seen that bracket plate 41 has no constraining L-shaped member associated with it to attach it to the frame member of the vehicle. Thus the mounting height is adjustable. Moreover, it can be further seen that the entire bracket assembly 9 is held essentially together by bolts, and not welds. Only lower bushing member tube 43A may be welded to side plates 45 and 47 if desired (at "W").

In this respect, bracket assembly 9 includes U-shaped cradle 39, bracket plate 41, upper plate 41a, bottom plate 57, and cross-member 55. When assembled, the various bolts extending through pivotal bushing members 35, 37 and 43 (and through plate 41, side plates 45, 47 and the vertical flanges of bottom plate 57), together with the bolts at plate 41a (bolting plate 41 to plate 41) and at cross-member 55 bolting this cross-member to the lateral flanges of bottom plate 57, as well as to the lateral flanges of plate 41, form a substantially weld free, strong and effective frame bracket assembly for mounting to the right and left frame members (now shown in FIG. 3) of a vehicle, such as a heavy duty truck or semi-trailer.

Figure 4:
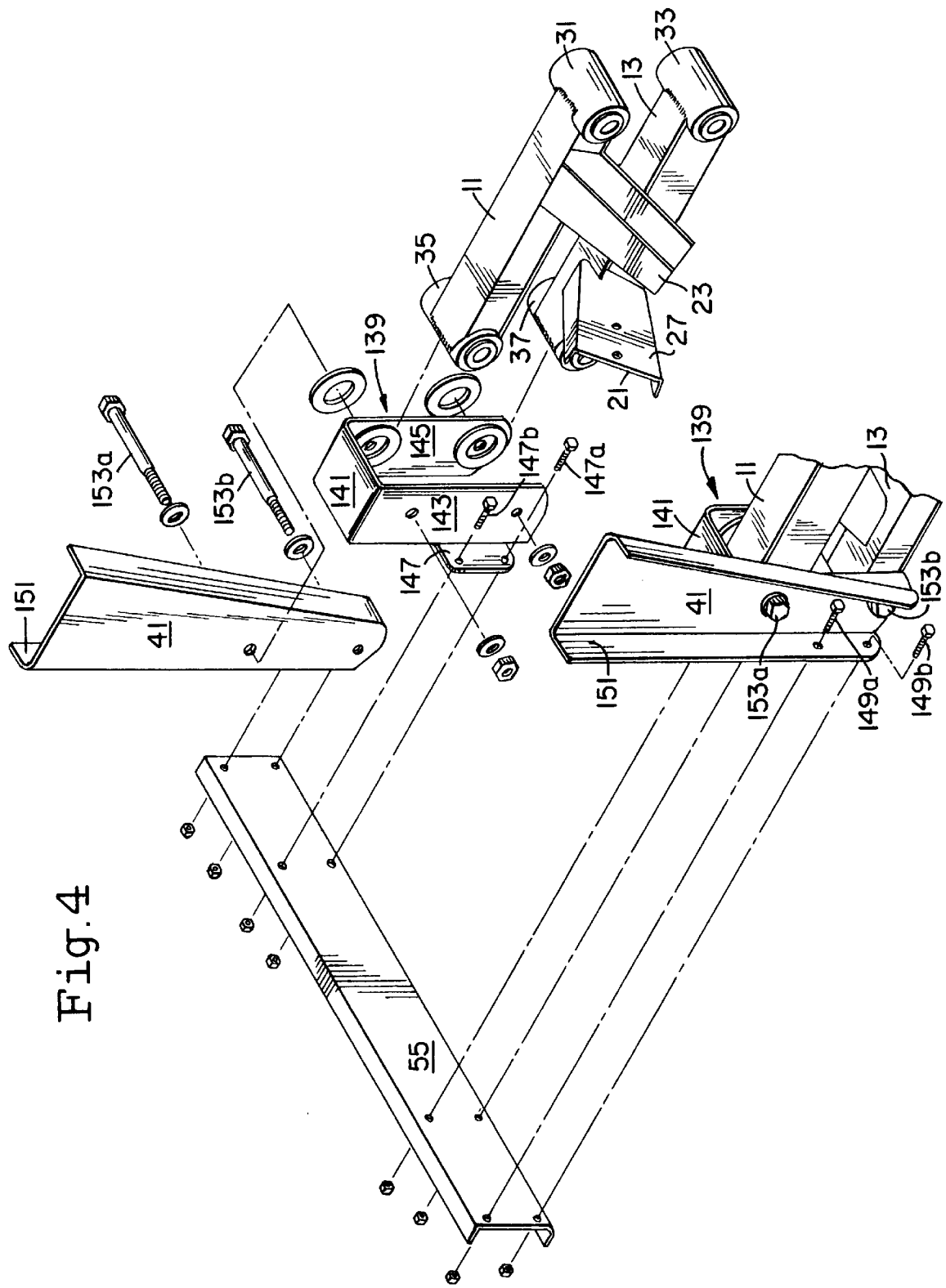
FIG. 4 is an exploded view of a bracket assembly and suspension (partial) as contemplated by this invention.

Attention is now directed to the embodiment of this invention as illustrated in FIGS. 4–6. This embodiment differs from the embodiment of FIG. 3 in that it does not employ the caster angle α adjusting mechanism of FIG. 3, thus employing only two pivot connections and, in addition, it employs a somewhat modified cradle member which does not need or use a bottom plate 57 (as illustrated in FIG. 3). Thus, as illustrated, cross-member 55, bracket plate 41, arms 11 and 13, and protrusions 21 and 23 remain the same. Cradles 139 are different, however, because a third pivot is no longer necessary due to the elimination of the caster adjusting mechanism.

Cradle 139, in this respect, is a generally single piece, U-shaped member requiring no welds. Cradle 139 is formed of an integral (one piece) top wall 141, and opposing side walls 143 and 145. Pivots 35 and 37 are the same as, and accommodated in cradle 139 in a similar way, as described above, with respect to the embodiment of FIG. 3. Because lower pivot 43 is eliminated, no welding of any kind need be employed. In addition, bottom plate member 57 is not used and, thus, conveniently flange 147 is provided in cradle 139 for providing a bolt flange to which crossbeam member 55 is attached by bolts 147a,b. Crossbeam member 55 is further held in place by bolts 149a,b extending through the forward lateral flange 151 of U-shaped bracket plate 41. The bracket assembly is then secured together as a unitary structure by bolts 153a,b which, of course, are the bolts that extend through and retain pivots 35 and 37 in cradle 139.

In this construction no welds are employed and the entire structure is secured by a few simple and easily installed nuts and bolts. Moreover, as best illustrated in FIGS. 5A, 6A, U-shaped bracket plate 41 does not have associated with it the height mounting constraint of employing an L-shaped bracket (e.g. FIG. 1) for mounting the suspension to the right and left frame rails 3R and 3L, respectively, of the vehicle. Rather, as illustrated by the up and down arrows in FIG. 6B, the mounting height is adjustable and, once selected, a standard bolt configuration is employed to bolt opposing brackets 41 to their respective frame rail 3R or 3L. This is often in practice, particularly where heavy duty trucks are involved, an important feature because at times the truck manufacturer may already have established a bolt hole configuration for use, or one may already exist in the case of a used truck being purchased. The adjustable nature of bracket 41 allows the bracket assemblies of this invention to be used with a wide variety of suspensions (other than the one illustrated and to accommodate existing bolt hole configurations on either new or used vehicles without the need/or minimizing the need) to drill further holes in frame rail 3R or 3L.

As a further feature of this invention, because bracket 41 is of a basic shape and form, simple in nature, with easily changed fanning angles, the bracket assemblies of this invention are particularly attractive to OEM truck manufacturers because the bracket's design allows it to be installed during frame building (no welds being required) while the remainder of the suspension and axle travel through the axle build area. The suspension and axle can then be attached by raising the unit between the mounting brackets and installing the four pivot bolts.

In this respect, attention is directed to FIGS. 7A–C wherein three different shapes for bracket 41 are disclosed, each employing a different "fanning" angle α. The use of such differently shaped brackets 41 allows for the use of this invention in a wide variety of situations to accommodate their specific envelopes of compliance, as well as different bolt patterns. In each instance, mounting height flexibility is achieved while the bracket assembly is either entirely or substantially free of any welds.

As an additional feature of this invention attention is redirected to FIG. 6A. As can be seen in this figure, there is no need to offset the suspension outboard of the center line of the frame rail. Indeed, in certain embodiments (as illustrated in FIG. 6A) the center line "$CL_s$" of the suspension actually is offset inboard slightly a distance ←d→ from the center line "$CL_R$" of frame rail 3.

As will be recognized by the skilled artisan familiar with the difficulties of mounting suspensions to the frame rails of vehicles, the frame bracket assemblies of this invention provide the advantageous characteristics of mounting flexibility (i.e. height adjustment), weight reduction due to the few simple parts employed, bolt pattern choice flexibility, and use of optimized recognized assembly line production techniques heretofore not achievable by the prior art. Once given this disclosure, therefore, many other features, modifications and improvements will become apparent to the skilled artisan. Such other features, modifications and improvements are, therefore, considered to be a part of this invention, the scope of which is to be determined by the following claims:

We claim:

1. A substantially weld free frame bracket for connecting a wheel-bearing axle suspension system to a frame member of a vehicle, said frame bracket comprising:

an elongated plate member having a first end for connection to said frame member of said vehicle and a second end opposite said first end;

a generally U-shaped cradle member including a pair of downwardly extending leg portions spaced laterally from each other and a laterally extending portion abridging the space between and connecting said spaced pair of leg portions one to the other; and an attachment connecting said cradle member to said elongated plate member, said attachment being located proximal said second end of said elongated plate member; wherein said elongated plate member and each of said pair of downwardly extending leg portions of said cradle include at least one orifice therein, each of said orifices being aligned with respect to the others and of a sufficient size to retain a thru-bolt therein, and wherein said attachment includes at least one bolt extending through said aligned orifices in said elongated plate member and said pair of downwardly extending leg portions of said cradle.

2. A substantially weld free frame bracket according to claim 1 wherein said elongated plate member and each of said pair of downwardly extending leg portions include a first set of aligned orifices and a second set of aligned orifices spaced from said first set, and wherein said non-welded attachment includes a first bolt extending through said first set of aligned orifices in said elongated plate member and said pair of downwardly extending leg portions of said cradle, and a second bolt extending through said second set of aligned orifices in said elongated plate member and said pair of downwardly extending leg portions of said cradle, said first and second bolts being substantially parallel one with respect to the other.

3. A substantially weld free frame bracket according to claim 1 wherein said elongated plate member is wider at said first end than at said second end and is comprised of a unitary non-welded plate which includes a substantially flat longitudinal central portion having a first and second edge and a contiguous flange portion extending from each said first and second edge.

4. A substantially weld free frame bracket according to claim 1 wherein said suspension system includes at least one control arm having at a first end thereof a pivot connection and wherein said pair of downwardly extending leg portions comprise plate members each of which includes an inner surface for retaining said pivot connection for at least one said control arm of said suspension system.

5. In a vehicle having a pair of longitudinally extending, laterally spaced frame members to which is attached an axle suspension having attached thereto a wheel-bearing axle, said axle suspension system being attached to each of said longitudinally extending, laterally spaced frame members by a respective frame bracket having a first end connected to a said respective frame member and a second end connected to said suspension system, the improvement comprising as each of said frame brackets a bracket according to claim 1.

6. In a vehicle according to claim 5 wherein said frame members comprise an upwardly extending surface and a horizontal bottom surface and said frame brackets do not contact said horizontal bottom surface of said frame members.

7. In a vehicle according to claim 6 wherein each said bracket is bolted to its said respective frame member by at least two bolts extending between said first end of said bracket and said upwardly extending surface of said respective frame member.

8. In a vehicle having a pair of longitudinally extending, laterally spaced frame members, each of said frame members including at least two longitudinal sections located in different horizontal planes, said vehicle further including a pair of wheel-bearing axle suspensions longitudinally spaced along said frame members and attached to said frame members by a respective frame bracket having a first end connected to a different longitudinal section of a respective frame member than the other frame bracket and each frame bracket having its second end connected to a respective suspension, the improvement comprising as said frame brackets, a bracket according to claim 1.

9. A substantially weld free frame bracket assembly for connecting a wheel-bearing axle suspension system to a pair of laterally spaced, longitudinally extending frame members of a vehicle, said frame bracket assembly comprising:
 a pair of elongated plate members laterally spaced one from the other, each plate member having a first end for connection to a respective frame member of said vehicle, and a second end; each said plate member having located proximal thereto a respective U-shaped cradle member; wherein
 each said generally U-shaped cradle member includes a pair of downwardly extending leg portions spaced laterally from each other and a laterally extending portion abridging the space between and connecting said spaced pair of leg portions one to the other; and
 a non-welded attachment connecting said cradle member to said elongated plate member, said attachment being located proximal said second end of said elongated plate member; and
 wherein said bracket assembly further includes a crossbeam member having a first end and a second end each connected to a respective one of said plate members.

10. A substantially weld free frame bracket assembly according to claim 9 wherein said crossbeam member is further connected to said cradle members.

11. A substantially weld free frame bracket assembly according to claim 9 wherein each said elongated plate member and each of said pair of downwardly extending leg portions of a said cradle include at least one orifice therein, each of said orifices being aligned with respect to the others and of a sufficient size to retain a thru-bolt therein; and
 wherein each of said non-welded attachments includes at least one bolt extending through respectively aligned orifices in said elongated plate members and downwardly extending leg portions of said cradles.

12. A substantially weld free frame bracket assembly according to claim 11 wherein each of said elongated plate members and each of said downwardly extending leg portions of a cradle member located proximal a respective plate member include a first set of aligned orifices and a second set of aligned orifices spaced from said first set, and wherein said non-welded attachment of each said cradle to a respective plate member includes a first bolt extending through said first set of aligned orifices in said elongated plate member and said pair of downwardly extending leg portions of said cradle, and a second bolt extending through said second set of aligned orifices in said elongated plate member and said pair of downwardly extending leg portions of said cradle, said first and second bolts being substantially parallel one with respect to the other.

13. A substantially weld free frame bracket according to claim 9 wherein each said elongated plate member is wider at said first end than at said second end and is comprised of a unitary non-welded plate which includes a substantially flat longitudinal central portion having a first and second edge and a contiguous flange portion extending from each said first and second edge.

14. A substantially weld free frame bracket according to claim 13 wherein said crossbeam member at each said end thereof is bolted to a said contiguous flange portion in a respective elongated plate member.

15. A substantially weld free frame bracket according to claim 14 wherein at least one downwardly extending leg portion of each said cradle member includes a flange member laterally extending therefrom and wherein said crossbeam member is bolted to said flange member of said leg portion.

16. A substantially weld free frame bracket according to claim 9, wherein said frame bracket further includes means for adjusting the caster angle of said axle.

17. In a vehicle having a pair of longitudinally extending, laterally spaced frame members to which is attached an axle suspension system having a wheel-bearing axle connected thereto, said axle suspension system being attached to each of said longitudinally extending, laterally spaced frame members by a respective frame bracket having a first end connected to a said respective frame member and a second end connected to said suspension system, the improvement comprising as each of said frame brackets a bracket according to claim 15.

18. In a vehicle according to claim 17 wherein said suspension comprises a pair of substantially parallel control arms associated with each frame bracket, each control arm having a first end located between said downwardly extending laterally spaced legs of a respective cradle and being pivotally attached to said cradle by a bolt extending therethrough, each said bolt also connecting said cradle to said frame bracket.

19. In a vehicle according to claim 18 wherein said suspension further includes with respect to each pair of control arms an axle seat having an axle connected thereto, and wherein each said control arm has a second end located opposite said first end, each said second end being pivotally connected to said axle seat.

20. In a vehicle according to claim 19 wherein said suspension is a lift axle suspension.

21. In a vehicle according to claim 20 wherein said lift axle suspension includes with respect to each pair of control arms a first airbag connected to said axle seat and a second opposing airbag attached to said control arms such that the inflation of one airbag and the deflation of the respective opposing airbag will cause the axle to move vertically.

22. In a wheeled vehicle having a longitudinally extending frame member and a frame bracket assembly attached to said frame member for connecting a wheel-bearing axle suspension system to the longitudinal frame member of said vehicle, said frame bracket assembly comprising:
 a plate member connected to and extending downwardly from said longitudinally extending frame member of said vehicle, said plate member including a planar surface facing laterally of said vehicle;
 a cradle member which includes a pair of opposing leg members extending downwardly with respect to said longitudinal frame member of said vehicle, said leg members having a laterally facing planar surface and being connected together by a laterally extending cross member, said cradle member being so located such that the planar surface of a said leg member is proximal to and laterally faces said planar surface of said plate member;
 at least one orifice in each of said plate members and said leg members wherein each said orifice is aligned with respect to the others, and
 bolt means extending through said aligned orifices for connecting said cradle member to said plate member.

23. In a wheeled vehicle according to claim 22 wherein said wheeled vehicle includes a longitudinal frame member on each side of said vehicle and each said longitudinal frame member has a said frame bracket assembly connected thereto; wherein a said leg of each said cradle member includes a laterally extending flange; and wherein said laterally extending flange has connected thereto a cross member which connects the frame bracket assembly connected to a longitudinal frame member on one side of said vehicle with the frame bracket assembly connected to the longitudinal frame member on the other side of said vehicle.

24. In a wheeled vehicle according to claim 23 wherein said frame bracket assemblies have a said wheel bearing axle suspension system connected thereto including an axle which extends laterally across said vehicle and connects said suspension systems together.

25. In a wheeled vehicle according to claim 24 wherein each said cradle is pivotable about said bolt means and said frame bracket assembly further includes means for adjusting the caster of said wheel bearing axle by pivoting said cradle about said bolt means.

26. In a wheeled vehicle according to claim 22 wherein said planar surface of said plate member extends a substantial distance downwardly from a top-most end of said plate member thereby allowing said bracket assembly and said suspension to be connected to said longitudinal extending frame member over a range of preselected heights with respect to a road surface on which said wheels of said vehicle travels.

27. In a wheeled vehicle according to claim 22 wherein said cradle and said longitudinally extending frame member each have a vertical center line, and wherein said center line of said cradle member is substantially contiguous with the center line of said frame member.

28. In a wheeled vehicle according to claim 27 wherein said center line of said cradle member is offset a distance inboard of said center line of said frame member.

29. In a wheeled vehicle according to claim 23 wherein each of said frame bracket assemblies has a said wheel bearing axle suspension system connected thereto, each said suspension system having a vertical center line, each said frame member having a vertical center line, and each said cradle member having a vertical center line, and wherein on each side of said vehicle said vertical center lines of said frame member, said cradle member and said suspension are substantially contiguous.

* * * * *

UNITED STATES PATENT AND TRADEMARK OFFICE
CERTIFICATE OF CORRECTION

PATENT NO. : 6,073,947
DATED : Jun. 13, 2000
INVENTOR(S) : Michael J. Gottschalk and Michael J. Keeler It is certified that error appears in the above-identified patent and that said Letters Patent is hereby corrected as shown below:

Column 3, line 50, insert -- . -- (period) after "...application)";
         line 55, delete "mechanism" after "The" and substitute -- mechanisms --.

Column 6, line 60, delete "a" after "angle" and substitute -- $\alpha$ --.

Signed and Sealed this

Third Day of April, 2001

*Attest:*

NICHOLAS P. GODICI

*Attesting Officer*      Acting Director of the United States Patent and Trademark Office